Figure 1:
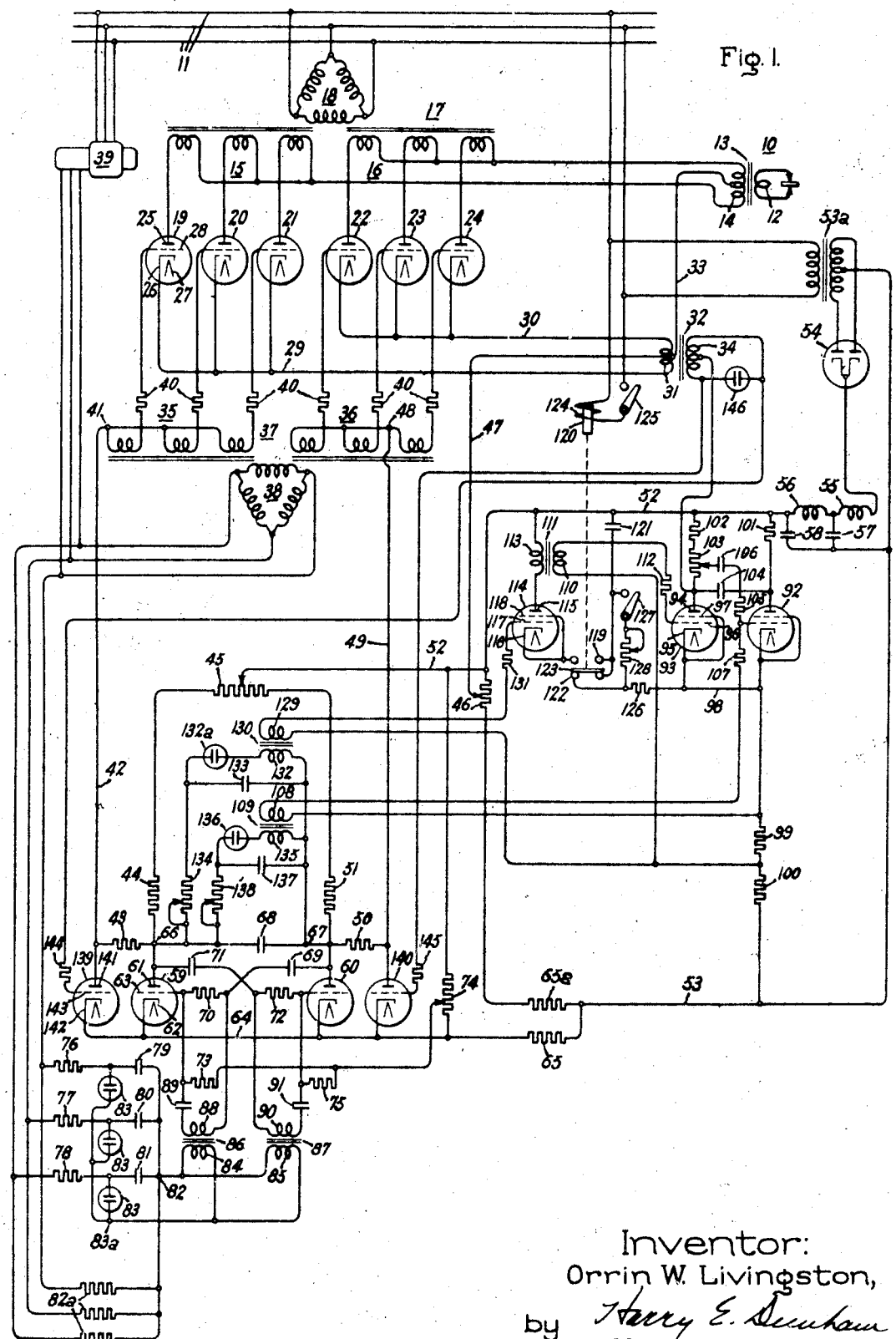

Inventor:
Orrin W. Livingston,
by Harry E. Dunham
His Attorney.

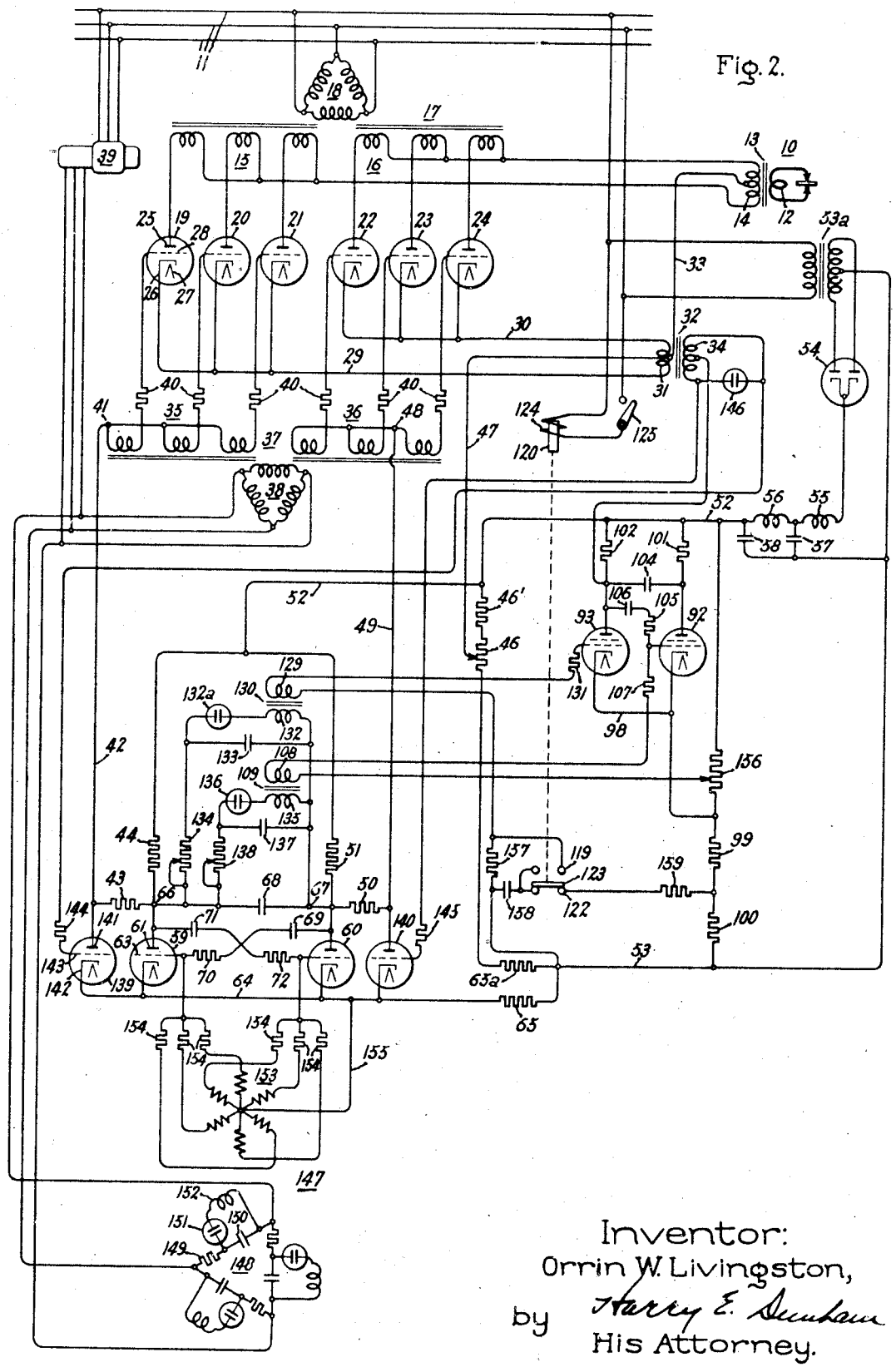

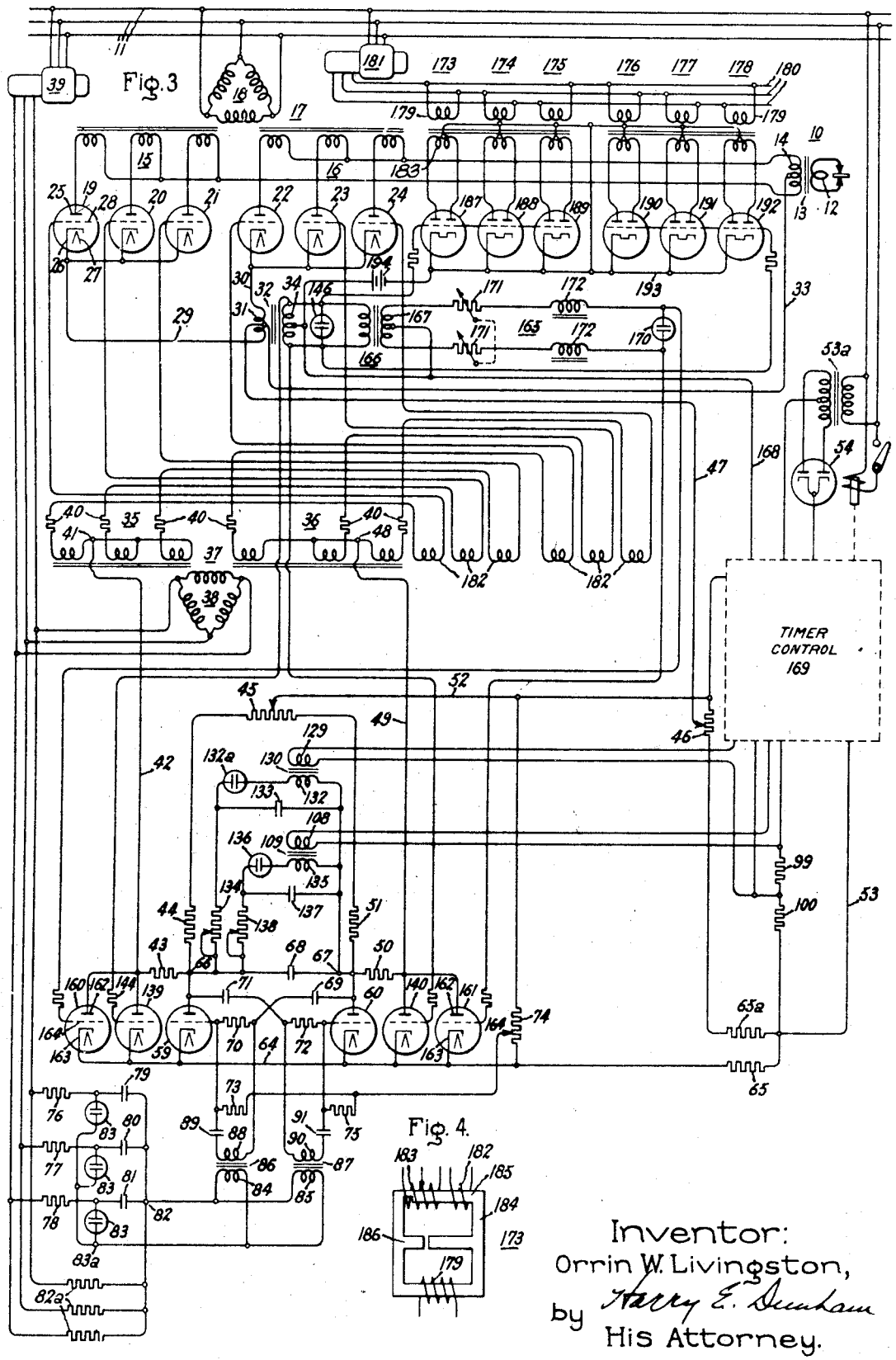

Patented Sept. 18, 1945

2,385,214

UNITED STATES PATENT OFFICE 2,385,214

ELECTRIC CONTROL CIRCUIT

Orrin W. Livingston, Scotia, N. Y., assignor to General Electric Company, a corporation of New York Original application April 23, 1942, Serial No. 440,159. Divided and this application September 17, 1943, Serial No. 502,834

8 Claims. (Cl. 175—363)

My invention relates to electric control circuits and more particularly to improved circuits for producing a periodic voltage. The present invention is particularly well adapted for use in connection with control systems for resistance welders.

This application is a division of my application Serial No. 440,159, filed April 23, 1942, entitled Electric control circuit, and now United States Letters Patent 2,348,553 granted May 9, 1944.

Electric valve circuits for energizing the welding transformer of resistance welding systems have been widely used and in many of these systems it is desirable to provide a periodic or timing voltage. In accordance with the present invention there is provided an improved circuit for producing a periodic voltage which may be readily modified in accordance with the operation of a timer, a heat control circuit, or some condition of the load circuit, such as the power factor, to modify the periodic voltage.

It is an object of my invention to provide a new and improved electric control circuit.

It is another object of my invention to provide a new and improved electric control circuit for producing a periodic control voltage.

It is a still further object of my invention to provide a new and improved electric control circuit for producing a periodic voltage in which means are provided for modifying the periodic voltage in accordance with one or more conditions.

In accordance with the illustrated embodiments of my invention, I provide an improved control circuit which is utilized as a frequency determining circuit for a frequency changer. The frequency changer comprises two groups of electric valves arranged to conduct alternately and interconnecting a polyphase supply circuit with a single phase load circuit. Current of one polarity is supplied to the load circuit through the valves of one group conducting in succession, and current of the opposite polarity is supplied through the valves of the other group conducting in succession. The frequency established by the frequency determining circuit may readily be adjusted and is synchronized with the alternating current supply circuit to maintain the desired wave shape of the low frequency voltage.

The operation of the frequency determining circuit of the electric valve frequency changer is modified by electronic timing circuits which are utilized to determine the periods at which the frequency changer is operative and inoperative to transfer energy to the load circuit. These electronic circuits are synchronized with the low frequency voltage by means responsive to the frequency established by the frequency determining circuit of the electric valve frequency changer. Means for delaying the transfer of current from one group of valves of the electric valve frequency changer to the other beyond the time established by the frequency determining circuit are provided to permit the flow of lagging power factor current. Thus, the illustrated embodiment of the invention provides for intermittent energization of a single phase low frequency load circuit from a polyphase alternating current circuit of higher frequency in which transients are eliminated and a considerably better loading of the supply circuit is obtained.

My invention will be better understood by reference to the following description taken in connection with the accompanying drawings and its scope will be pointed out in the appended claims. In the drawings, Fig. 1 is a schematic representation of one embodiment of my invention; Fig. 2 is a schematic representation of a modification; Fig. 3 is a schematic representation of another embodiment of my invention which incorporates additional features of control in a circuit similar to the modification of Fig. 1; and Fig. 4 is a detailed view of one of the transformers utilized in the arrangement of Fig. 3.

Referring now to Fig. 1 of the drawings, I have shown my invention embodied in an electric valve translating system and a control circuit therefor for effecting the intermittent energization of a load circuit 10 with current of one frequency from an alternating current supply circuit 11 of another frequency. As illustrated, the load circuit is the work circuit of a resistance welder and is energized by the secondary winding 12 of a welding transformer 13 having a midtapped primary winding 14. The end terminals of the primary winding 14 are connected respectively with the neutral terminals of the Y-connected secondary windings 15 and 16 of a supply transformer 17, having the primary winding 18 thereof energized from the alternating current supply circuit 11. The midtap of the transformer winding 14 and the phase terminals of the transformer secondary windings 15 and 16 are interconnected by groups of electric discharge valves 19, 20, 21 and 22, 23, 24. The electric valves may be of any of the types well known in the art and, as illustrated, each comprises an envelope containing an ionizable medium such as a gas or vapor, and enclosing an anode 25, a cathode 26, an associated heater element 27 and a control member or grid 28. As shown in the drawings, the anodes of valves 19, 20 and 21 comprising one group are connected with the phase terminals of secondary winding 15 and the anodes of valves 22, 23 and 24 comprising the other group are connected with the phase terminals of secondary winding 16. The cathodes of the group comprising valves 19, 20, 21 are connected together by conductor 29 and the cathodes of the group comprising valves 22, 23 and 24 are connected together by conductors 30. The cathodes of the two groups are connected together through the midtapped primary winding 31 of a current transformer 32. The circuit to the primary winding 14 of the welding transformer 12 is completed from the midtap of winding 31 to midtap of winding 14 by conductor 33. The secondary winding 34 of the current transformer 32 is provided for a control function to be described at a later point in the specification.

As is well understood by those skilled in the art, the power circuit thus far described may be controlled so that the groups of valves 19, 20, 21 and 22, 23, 24, conduct alternately, with the valves of each group conducting consecutively and in this way to supply alternating current to the load circuit having a lower frequency than the supply circuit. It will also be understood that the voltage supplied to the load circuit may be controlled by adjusting the phase shifting means. In a welding circuit this provides means for controlling the welding heat. In order to control the moment in the voltage wave of the alternating current supply circuit 11 that each of the valves is rendered conductive, I provide an excitation circuit including means for impressing an alternating component of voltage of the frequency of the supply circuit on the control members 28. In order to control the transfer of current from one group of valves 19, 20, 21 to the other group 22, 23, 24 and back again at a definite periodicity I provide for producing a second component of control voltage which, in the arrangement illustrated, is a direct current component. This component voltage is also modified to render all of the electric valves non-conductive to determine the periods during which the load circuit is not energized. The alternating current component of excitation voltage is derived from the alternating current supply circuit 11 and impressed on the control members 28 by the phase terminals of the Y-connected secondary windings 35 and 36 of excitation transformer 37 having the delta-connected primary winding 38 thereof energized from a phase shifting device 39 which in turn is energized from the alternating current supply circuit 11. The phase terminals of the secondary windings 35 and 36 are connected respectively with the control members 28 of electric valves 19–24 through suitable current limiting resistors 40. The control member-to-cathode circuit of electric valves 19, 20 and 21 is completed from the neutral terminal 41 of secondary winding 35 of the excitation transformer through conductor 42, resistor 43, resistor 44, the left-hand portion of resistor 45, a portion of a voltage dividing resistor 46, conductor 47, half the primary winding 31 of current transformer 32, to the cathode conductor 29 of the electric valves 19, 20, 21. In a similar manner the control member-to-cathode circuit of the electric valves 22, 23 and 24 is completed from the neutral terminal 48 of the secondary winding 36 of the excitation transformer through a conductor 49, resistor 50, resistor 51, the right-hand portion of the resistor 45, a portion of the voltage dividing resistor 46, conductor 47, half the primary winding 31 of transformer 32, to conductor 30.

From the foregoing description, it is apparent that the excitation circuit of valves 19, 20, 21 includes in series resistors 43, 44, a part of resistor 45 and a portion of voltage dividing resistor 46, and likewise that the excitation circuit of valves 22, 23, 24 includes in series resistors 50, 51, a part of resistor 45 and a portion of voltage dividing resistor 46. In accordance with important features of the present invention, the voltages across these resistors are controlled to determine the frequency and the periods of energization and deenergization of the load circuit as well as to permit lagging power current to flow to the welding circuit. A source of direct current control voltage for energizing these resistors is impressed on conductors 52 and 53. In the arrangement illustrated in the drawing the direct current is obtained from one phase of the alternating current supply circuit 11 by means of a full wave rectifier including a transformer 53a and an electric valve means 54 having two discharge paths. The output of the electric valve rectifier system including transformer 53a and valve means 54 is filtered by inductive reactances 55 and 56 connected in series with one of the direct current lines and capacitors 57 and 58 connected in parallel with the direct current output circuit of the electric valve rectifier.

In order that the electric valve system, including the groups of valves 19, 20, 21 and 22, 23, 24, operate as a frequency changer it is necessary periodically to render one of the groups nonconductive for a period equal to one half-cycle of the frequency of the load circuit. In the illustrated embodiment of the invention this is accomplished by means of an electronic oscillator and specifically an electric valve inverter of the parallel type having the valves connected with respect to the source of direct current control voltage and the resistors in the excitation circuit of the groups of valves 19, 20, 21 and 22, 23, 24 alternately to impress a negative voltage in the neutral connection of the excitation transformer secondaries 35 and 36, respectively, at the frequency of operation of the inverter.

Referring now to the drawing the inverter comprises electric discharge valves 59 and 60 preferably of the type employing an ionizable medium, such as a gas or vapor, and each comprising an anode 61, a cathode 62 and a control member or grid 63. The cathodes of valves 59 and 60 are connected together by a conductor 64 and to the negative side of the direct current control voltage supply 52 through a resistor 65. A resistor 65a is connected in series with resistor 46 and the two connected across the direct current lines 52, 53. The anode 61 of valve 59 is connected to the common terminal 66 of resistors 43 and 44 and the anode of electric valve 60 is connected with the common terminal 67 of resistors 50 and 51. Since the midpoint of resistor 45 is connected with the positive side of the direct current control voltage 52 it will be seen that this circuit provides a parallel inverter energized from the source 52, 53 in which the anode circuit of one of the discharge paths of the inverter includes resistor 44 and half of resistor 45 which are also in the neutral connection of the excitation transformer secondary winding 35 associated with the group of electric valves 19, 20, 21, while the anode-cathode circuit of the other discharge path of the parallel inverter includes the resistance element 81 and the right-hand portion of resistance element 45 which are also in series in the neutral connection of the excitation transformer secondary winding 35 associated with valves 22, 23, 24. From an inspection of the circuit just described, it is apparent that when valve 59 is conducting the terminal 66 will be brought to substantially the voltage of conductor 64 which is negative with respect to conductor 52 and in this way a negative bias is impressed on the neutral of transformer secondary winding 35 by resistor 44 and a portion of resistor 45. This bias has a magnitude sufficient to overcome the positive bias inserted in the circuit by the voltage divider 46 and the periodic voltage of winding 35 and thereby render the group of valves 19, 20, 21 nonconducting. When the valve 60 is rendered conductive the terminal 67 is brought to substantially the potential of the conductor 64 and the group of valves 22, 23, 24 are rendered nonconductive. In order to render valves 59 and 60 alternately conductive thereby to render the groups of valves 19, 20, 21, and 22, 23, 24 alternately conducting and nonconducting to determine the frequency of the voltage supplied to the transformer 13 a resistor-capacitor circuit is associated with each of the control members 63 of valves 59 and 60 and a commutating condenser 68 is connected between the terminals 66 and 67 to render the anode of one of the valves negative momentarily at the time that the control member of the other valve is energized to render the associated valve conducting. The control member 63 of electric valve 59 is connected to the terminal 67 through a condenser 69 and resistor 70 while the control member 63 of valve 60 is connected to the terminal 66 through a condenser 71 and resistor 72. The circuit from the control member 63 of valve 59 is completed to the cathode conductor 64 through a resistor 73 and a portion of voltage dividing resistor 74 which is in series with resistor 65 across direct current source 52, 53. Similarly, a circuit from the control member 63 of the valve 60 is completed to the conductor 64 through a resistor 75 and a portion of the voltage dividing resistor 74.

The operation of the condenser resistor circuit for determining the frequency of operation of the inverter comprising electric valves 59 and 60 will now be briefly described. Assuming that valve 59 has started to conduct, current will flow from the terminal 67 through condenser 69, resistor 70, through the control member to the cathode circuit to the negative line of the direct current control voltage source. This charges the condenser 69 so that the terminal thereof electrically nearer the control member of the valve 59 is more negative. During the time that valve 59 is conducting the condenser 71 discharges through a circuit including the anode-cathode circuit of valve 59, conductor 64, a portion of voltage dividing resistor 74, resistor 75 and resistor 72. The time required for the condenser 71 to discharge sufficiently to render the control member 63 of valve 60 more positive than the critical voltage may be adjusted by varying the position of the slider on the voltage dividing resistor 74. At the time the control member of valve 60 becomes more positive than the critical voltage, current is transferred from valve 59 to valve 60 with the aid of the commutating capacitor 68 which has been charged during the conducting period of valve 59 to render the anode thereof temporarily negative. When the valve 60 is conducting and condenser 71 is charged so that the control member of valve 60 is rendered negative, condenser 69 is discharging through a circuit including resistor 70, resistor 73, a portion of voltage dividing resistor 74, and the anode-cathode circuit of electric valve 60 so that after a predetermined time the control member of valve 59 will again be rendered more positive than the critical voltage and with the aid of commutating condenser 68 current will be commutated from valve 60 to valve 59. From the above description it is seen that the frequency of operation of the inverter is controlled by the constants of the discharge circuits for the capacitors 69 and 71. By making the constants of these two circuits equal the periods of conduction of valves 59 and 60 are equal and the electric valve frequency changer including the groups of valves 19, 20, 21 and 22, 23, 24 operates to produce successive half cycles of equal duration.

While the resistance capacitance timing of the inverter may be made relatively accurate, I provide means for synchronizing the operation of the inverter with the voltage of the alternating current supply circuit 11 in order to prevent drifting of the inverter with respect to the alternating current supply circuit 11 and in this way maintain the desired wave shape of voltage on the load circuit. In the arrangement illustrated this means for synchronizing the operation of the inverter comprises means for impressing periodic voltages of peaked wave form on resistors 70 and 72 associated with the control members 63 of valves 59 and 60, respectively. The synchronizing voltages are obtained from a network of resistors, capacitors and cold cathode discharge devices of the type commonly referred to as glow tubes.

Referring to the drawings, resistors 76, 77, and 78 and capacitors 79, 80, and 81 are connected to provide a three-phase Y-connected network with each phase including in series a resistor and a capacitor. One terminal of each of the capacitors 79, 80 and 81 are connected together to provide a neutral terminal 82, the voltage of which with respect to the output of the phase shifting device 39 is established by Y-connected impedance elements such as resistors 82a. The discharge devices 83 are connected in a three-phase Y having one electrode of each device connected to a neutral connection 83a and the other terminal of each device connected respectively to the common terminal of the resistor and capacitor of each of the phases of the Y-connected network of series resistors and capacitors. Connected across the neutral terminals 82 and 83a are the primary windings 84 and 85 of transformer devices 86 and 87, respectively. Secondary winding 88 of transformer 86 is connected across the resistor 70 in circuit with the control member 63 of electric valve 59. A capacitor 89 is connected in series with the secondary to offer high impedance to the flow of direct current through the transformer secondary winding 88. Similarly, the secondary winding 90 of transformer 87 is connected across the resistor 72 of electric valve 60 and a capacitor 91 is connected in series therewith to offer a high impedance to the flow of direct current through the transformer winding. From the drawings it is seen that this network provides three parallel circuits across the terminals of the primary windings 84 and 85 with each circuit including in series a glow tube and capacitor. The breakdown of any glow tube permits the flow of current through the transformer primary winding. The capacitors 79, 80 and 81 are charged from the alternating current supply circuit 11 through resistances 76, 77 and 78, respectively, and when any one of the capacitors has charged to a voltage corresponding to the breakdown voltage of the associated glow tube a voltage is suddenly impressed on the transformer windings which is equal to the difference between the breakdown voltage and the voltage of conduction of the glow tube. The condenser resistor circuit and the characteristics of the glow tube are so correlated that the glow tube breaks down at a predetermined point in each half cycle of voltage in the alternating current supply circuit 11. While it is possible to adjust the instant of breakdown of device 83, by varying the magnitude of resistors 76, 77, 78 or capacitors 79, 80, 81, it has been found desirable to energize the network from the supply circuit 11 through phase shifter 39 which also energizes transformer 37. Thus it is apparent that one of the glow tubes breaks down every sixty electrical degrees with respect to the voltage of the alternating current circuit 11 and that voltage peaks are produced in transformers 86 and 87 every sixty electrical degrees. The secondary windings 88 and 90 are connected with resistors 70 and 72, respectively, so that the peaks impressed on the control members of electric valves 59 and 60 at any instant are of opposite polarity. Circuits for producing voltages of peaked wave form and adjustable phase of the type described forms the subject matter of my application Serial No. 440,157, filed April 23, 1942, now United States Letters Patent 2,366,537 granted January 2, 1945, and assigned to the same assignee as the present invention. As applied to the system of the present invention these peaked voltages are utilized to synchronize the operation of the inverter comprising valves 59 and 60 with the alternating current supply circuit 11. This is accomplished by correlating the magnitude of the voltage peaks with the voltage impressed on the control members 63 of valves 59 and 60 by condensers 69 and 71 so that the resultant voltage exceeds the critical voltage at the desired instant.

From the standpoint of symmetrical wave shape in the load circuit it has been found desirable to operate the frequency changer so that the load frequency $$F_L = F_s \frac{180}{\frac{360N}{P} + 180}$$

where Fs is the frequency of the supply, N is an integer and P is the number of phases of each of the supply transformer secondaries. If Fs is sixty cycles, N is two, and P is three as it is in the illustrated embodiment, $F_L$ is $25^5/_7$ cycles. One half cycle of the load frequency then extends over a period of 420 electrical degrees with respect to a sixty cycle base. When operating on this basis it is desired that current be transferred from tube 59 to tube 60, or vice versa, every 420 electrical degrees. Since the peaked voltages impressed on resistors 70 and 72 occur every sixty electrical degrees it is necessary for synchronous operation to choose the circuit constants of the elements in circuit with control members 63 so that the voltage of the control member of the tube which is to be rendered conductive comes near enough to the critical voltage at the end of the 420 degree interval that the voltage of peaked wave form is sufficient in magnitude to render the valve conductive.

The system thus far described provides for the transformation of alternating current voltage of the frequency of the supply circuit 11 to voltage of another frequency which is impressed on the transformer 13, the frequency being determined by the inverter comprising tubes 59 and 60 and the load voltage being synchronized with the supply circuit 11 by means of peaked voltages impressed on the control members of valves 59 and 60 by transformers 86 and 87.

My invention is particularly well adapted for effecting the intermittent energization of the load circuit and also providing for the flow of lagging power factor current. The features of control which provide this operation will now be described. Energized from the direct current lines, 52, 53 is a parallel type electric valve inverter comprising electric valves 92 and 93. These electric valves are preferably similar to the valves 59 and 60 and each comprises an envelope containing an ionizable medium such as gas or vapor, an anode 94, a cathode 95, a control member or grid 96, and a shield grid 97. The cathodes 95 of valves 92 and 93 are connected together by a cathode bus 98 and through series resistors 99 and 100 to the negative line 53 of the direct current control voltage source. The anode of electric valve 92 is connected with the positive line 53 through a resistor 101. The anode of electric valve 93 is connected with the positive line 52 of the direct current control voltage source through resistors 102 and 103 in series. A commutating capacitor 104 is connected between the anodes of valves 92 and 93. The control member 96 of valve 92 is connected to an intermediate point on resistor 103 through resistor 105 and capacitor 106 and also to the cathode bus 98 through a resistor 107, the secondary winding 108 of a synchronizing transformer 109. The cathode-to-control member circuit of the electric valve 93 is completed through the resistor 99, which impresses a negative bias on the control member, the secondary winding 110 of a transformer 111 and a current limiting resistor 112. The primary winding 113 of the transformer 111 is connected in the anode-cathode circuit of an electric valve 114 which is of the same construction as the electric valves 92 and 93 and comprises an anode 115, a cathode 116, a control member or grid 117, and a shield grid 118. One terminal of the transformer primary winding 113 is connected to the positive terminal 52 of the direct current control voltage source and the other terminal thereof is connected to the anode 115 of valve 114. The cathode 116 is connected to one of a pair of spaced fixed contacts 119 of an electromagnetic switch 120. A condenser 121 has one electrode thereof connected with the terminal 52 of the direct current circuit and the other treminal thereof connected to the other fixed contact 119. The switch 120 is also provided with spaced fixed contacts 122 and a movable bridging contact 123 controlled by an operating coil 124 which is energized from one phase of the source 11 under the control of a manual switch 125. One of the fixed contacts 122 is connected to the cathode bus 98 through a resistor 126 while the other of the fixed contacts 122 is connected to the same terminal of condenser 121 as one of the fixed contacts 119. The bridging contact 123 is arranged to connect the contacts 122 when the operating coil 124 is deenergized and in this way complete a charging circuit for condenser 121 from the positive line 52 of the direct current circuit through resistors 126, 99 and 100 to the negative line 53 of the direct current circuit. With electric valve 92 conducting this charge is limited to the drop across electric valve 92 and resistor 101. When the coil 124 of switch 120 is energized the contacts 119 are bridged and the condenser is discharged through the electric valve 115. Shunting the contacts 119 and 122 of the switch 120 is a series connected manual switch 127 and a variable resistor 128. The circuit for energizing control member 117 of electric valve 114 is completed through contacts 119 of switch 120, condenser 121, resistor 101, electric valve 92, resistor 99, the secondary winding 129 of a synchronizing transformer 130, and a current limiting resistor 131. The synchronizing transformers 109 and 130 are utilized to produce synchronizing voltage impulses at the frequency supplied to the load circuit, or in other words at the frequency of operation of the inverter comprising electric valves 59 and 60. The circuits employed for obtaining the peaked voltages are similar to those used for synchronizing the operation of the inverter with the supply circuit. As illustrated, the primary winding 132 of transformer 130 is connected in series with the glow discharge device 132a and across a condenser 133 which is charged in accordance with the voltage across commutating capacitor 68 through an adjustable resistor 134. Similarly, the primary winding 135 of synchronizing transformer 109 is connected in series with a glow discharge device 136 and across a condenser 137 which is charged in accordance with the voltage of commutating capacitor 68 through an adjustable resistor 138.

The electric valves 92, 93 and 114 and their associated control circuits provide an electronic timer control which operates to effect intermittent energization of the load circuit with trains of half waves of voltage having the frequency established by the electric valve inverter comprising valves 59 and 60 by controlling the conductivities of electric valves 139 and 140. These latter valves are preferably of the high vacuum type and each comprises an anode 141, a cathode 142 and a control member or grid 143. The cathodes of both valves 139 and 140 are connected to the same cathode bus 64 as valves 59 and 60. The anode 141 of valve 139 is connected to terminal 66 through a resistor 43 while the anode 141 of valve 140 is connected with the terminal 67 through resistor 50. Thus, if electric valve 139 is conducting it maintains the group of valves 19, 20 and 21 nonconducting by maintaining a negative voltage across resistors 43, 44 and a portion of resistor 45 in the same manner that conduction of valve 59 maintains the terminal 66 at a negative potential. Similarly, when valve 140 is conducting the group of valves 22, 23, 24 is rendered nonconductive. In this way by controlling the conductivity of valves 139 and 140 it is possible to delay the transfer of current from the valves 19, 20, 21 to the other group 22, 23, 24, for example, beyond that determined by operation of electric valves 59 and 60 and by simultaneously controlling the conductivity of valves 139 and 140 in the same way to cause intermittent energization of the load circuit. To effect the desired control of the electric valves 139 and 140 the control members thereof are energized in accordance with the conductivity of electric valves 92 and 93 and also in accordance with the flow of current through the respective groups of valves 19, 20, 21 and 22, 23, 24. For example, the control member 143 of electric valve 139 connected through current limiting resistor 144 to one end terminal of the secondary winding 34 of current transformer 32 while the control member 143 of electric valve 140 is connected through a current limiting resistor 145 to the other end terminal of the secondary winding 34. The mid terminal of the secondary winding 34 is connected to the anode of electric valve 93. Thus when electric valve 93 is conducting the control member to cathode circuit of electric valves 139 and 140 is completed through valve 93, cathode bus 98, resistors 99, 100 and 65. When valve 93 is nonconducting and valve 92 is conducting the circuit is completed from the midpoint of transformer secondary winding 34 through resistors 103, 102, 101, electric valve 92 and resistors 99, 100 and 65. By proper proportioning of the resistors enumerated above it is possible to render the electric valves 139 and 140 conducting to a substantial degree when electric valve 92 is conducting, since at that time the midpoint of the transformer 34 is raised substantially to the full positive voltage of the line 52. When electric valve 93 is conducting, the midpoint of transformer winding 34 is depressed substantially to the voltage of one terminal of resistor 99 which is sufficiently negative to bias the electric valves 139 and 140 substantially to cut-off. It is understood that the proper values of bias under the different conditions of conductivity of valves 92 and 93 is obtained by proper proportioning of the resistance elements enumerated in the circuits of the control members 143 of electric valves 139 and 140. In the above discussion the effect of any voltage appearing across the opposite halves of the winding 34 has been neglected. This transformer is included in the control member circuit of the electric valve 134 to provide a source of bias on the control members dependent upon the flow of current in either group of valves. For example, if current is flowing through the group of valves 19, 20, 21 it is desirable that the valves 22, 23, 24 be held off even though the master inverter operates to render the group of valves 22, 23, 24 conductive. The end terminals of the secondary winding 34 are connected to the control members of valves 139 and 140 in such a manner that the voltage impressed on the control member of electric valve 140 is positive when valves 19, 20, and 21 are conducting and in this way the valves 22, 23, 24 are prevented from becoming conductive until the current conducted by valves 19, 20, 21 has ceased to flow. This provision takes care of lagging power factor current as long as the power factor does not become so low as to extend the current for more than 180 degrees referred to the supply line frequency after the last valve of the conducting group is rendered conductive. In the arrangement illustrated in Fig. 3 which will be described at a later point in the specification, provision is made for supplying inverter excitation with respect to the frequency of the supply line voltage so that energy may be transferred between the supply and load circuits under any power factor condition. A voltage maintaining glow discharge device 146 is connected across the transformer secondary winding 34 to maintain a substantially square voltage wave and permits a step-up transformer to be used so that substantially full controlling influence of the transformer 32 is available so long as any current whatever flows in the load circuit.

Although the operation of some parts of the circuit has been included in the foregoing description, a more complete description of the operation of the system as a whole will serve to bring out more clearly the features and advantages of the present invention. Let it be assumed that switches 125 and 127 are in the open position and that the supply line 111 is energized and the cathodes of all the electric valves are at operating temperature. Under these circumstances the direct current supply lines 52, 53 are energized through the rectifier 54. The application of voltage to the lines 52 and 53 causes electric valve 82 to conduct. Also electric valves 59 and 60 conduct alternately at a frequency dependent upon the resistor capacitor constants of the control circuits associated therewith, as previously described. However, the conduction by electric valve 82 serves to render conductive the valves 139 and 140, which may be termed restraining valves, so that a negative or hold-off voltage is impressed upon the neutral terminals 41 and 48, respectively, of the groups of valves 19, 20, 21 and 22, 23, 24. If it is desired to initiate a weld the switch 125 is closed. This closes contact 123 on contacts 119 and completes a circuit for condenser 121 through the anode-cathode circuit of electric valve 114. Condenser 121 has been charged during the time that contact 123 has engaged the fixed contact 122 so when contacts 119 are closed it tends to discharge through the electric valve 114 and induce a voltage in the transformer winding 110. In order that the voltage impulse induced in winding 110 be synchronized with the frequency at which it is desired to energize the load circuit the control member 117 of valve 114 is biased negatively by the voltage across the resistor 99 and is rendered positive at a definite time in the low frequency voltage wave appearing across the commutating condenser 88 by means of the peaked voltage periodically induced in winding 130. In this way the time of the voltage impulse in winding 110 determines the time at which the energization of the load circuit is initiated. As is well understood by those skilled in the art, the instant at which energization of the load circuit occurs is important with respect to the transient currents which flow and by synchronizing the instant the initiation of energization with the low frequency circuit so that energization always takes place at a definite time, preferably at the power factor angle of the load circuit, it is possible to reduce transients to a minimum. From the description which has preceded, it is apparent that the phase relation of the voltage peak induced in winding 130 with respect to the load circuit may be adjusted by adjusting resistor 134. The voltage induced in winding 110 is positive with respect to the cathode of electric valve 93 and overcomes the bias impressed on the control member 96 thereof by resistor 89 so that the electric valve 93 is rendered conductive immediately following the conduction of electric valve 114. As soon as the control member of electric valve 93 is rendered positive the valve begins to conduct and valve 92 becomes nonconductive due to the operation of the commutating capacitor 104 and the condenser 106 and resistor 105 which function very similar to the capacitor and resistor connected in series with the control members of the valves of the master inverter. That is, when valve 93 starts to conduct the condenser 106 charges through resistor 105 and the anode-cathode circuit of valve 92 and becomes negative so that as soon as electric valve 93 is rendered conductive the current is commutated from valve 92 to valve 93 with the aid of the commutating capacitor 104. When valve 93 starts to conduct the anode is brought to substantially the potential of the cathode bus 80 and the control members of electric valves 139 and 140 consequently are made negative. As previously stated the resistors in the control member-to-cathode circuit of electric valves 139 and 140 are proportioned so that with electric valve 93 conducting the valves 139 and 140 are biased substantially to cut-off and the groups of valves 19, 20, 21 and 22, 23, 24 are rendered alternately conductive and nonconductive at the frequency determined by the master inverter comprising electric valves 59 and 60. While electric valve 93 is conducting the charge on condenser 106 is decreasing and after a predetermined time depending upon the position of the slider on resistor 103 and the magnitude of the capacitor 106 and resistors 105 and 107, control member 96 of valve 92 becomes sufficiently positive so that a voltage impulse in the secondary winding 108 of the synchronizing transformer 109 is sufficient to render valve 92 conductive. At this time current is commutated from the valve 93 to 92 and both of the restraining valves 139 and 140 are again rendered conductive. In this way the load is deenergized after a time interval dependent upon the period that valve 92 is nonconductive which may be adjusted by adjusting the timing circuit associated with the control member thereof. A system employing a timing circuit similar to that comprising parallel connected electric valves 92 and 93 for effecting the intermittent energization of a load circuit through controlled electric valves is described and claimed in my copending application Serial No. 432,901, filed February 28, 1942, entitled "Electric valve control circuit," now United States Letters Patent 2,366,038 granted December 26, 1944, and assigned to the same assignee as the present invention. Claims covering the subject matter generic to my above identified application and the present application are presented in the earlier filed application. Deenergization of the load is also synchronized with the low frequency by means of the voltage impulse produced by winding 108 so that complete cycles of the low frequency are supplied to the load circuit. Thus closing switch 125 initiates a period of energization of the load circuit at the low frequency with both beginning and ending of the period of energization being synchronized with the load frequency. If it is desired to seam weld or, in other words, to produce a succession of alternate periods of energization and deenergization of the welding circuit the switch 127 is closed; then when switch 125 is closed, electric valve 114, condenser 121 and the charging circuit therefor operate as a single tube inverter which produces a periodic impulse in the secondary winding 110 and thereby periodically render electric valve 93 conductive to initiate periodic energization of the load circuit. As described before, the synchronizing transformer 130 synchronizes the conducting periods of electric valve 114 with the load frequency. The slider on resistance 128 provides means for adjusting the interval between successive welds, or in other words the periods of deenergization of the load circuit. As described earlier in the specification the current transformer 32 operates to delay the transfer of current from one group of valves to the other by rendering the restraining valve associated with the incoming group conductive until the current conducted by the outgoing group has decreased substantially to zero.

The magnitude of the voltage impressed on the load circuit, and in the case of a welding circuit the heat, may be adjusted by shifting the phase of the hold-off or restraining voltage with respect to the load circuit, as will be explained in connection with Fig. 3, or as illustrated in Fig. 1, may be controlled by shifting the phase of the excitation potential at the supply frequency by means of phase shifting device 39. This provides means for controlling the magnitude of the load circuit current.

In Fig. 2 I have shown a modification of my invention which is quite similar to that illustrated in Fig. 1 and the same reference numerals have been applied to designate corresponding parts. In the arrangement shown in Fig. 2 the network for synchronizing the operation of the master inverter or frequency determining means if slightly different and the control function of electric valve 114 of the arrangement illustrated in Fig. 1 has been incorporated directly in the control member-to-cathode circuit of electric valve 93.

Referring now to Fig. 2 the master inverter comprising valves 59 and 60 is synchronized with the supply line voltage by a network 147 comprising a delta-connected primary network 148 including in each phase a series connected resistor 149 and capacitor 150. Across the capacitor in each phase is connected in series a glow discharge device 151 and a transformer primary winding 152. Inductively coupled with the transformer winding 152 is a six-phase star connected secondary network 153 having alternate phase terminals connected to the control members 63 of electric valves 59 and 60, respectively, through current limiting resistor 154. The neutral of each star-connected network 153 is connected to the cathode bus 64 through a conductor 155. It will be apparent to those skilled in the art that the operation of the synchronizing circuit just described is essentially the same as the synchronizing network utilized in connection with the modification shown in Fig. 1.

The electric valves 92 and 93 are connected in a manner similar to that shown in the modification described in Fig. 1. The condenser-resistor timing circuit for the valve 93 differs from that shown in Fig. 1 in that one terminal of condenser 106 is connected directly with the anode of tube 93. However, the adjustment for the condenser-resistor circuit is provided by means of a variable tap on a resistor 156 which is connected between the cathode bus 98 and positive line 52 of the direct current supply circuit. As previously stated, the control function of the valve 114 of Fig. 1 is at least partially incorporated directly in the control member-to-cathode circuit of valve 93. Thus the control member-to-cathode circuit of valve 93 is completed through current limiting resistor 131, synchronizing transformer secondary winding 129, resistor 157 to the negative side 53 of the direct current supply circuit 63 which is connected with the cathode of valve 93 through resistors 99 and 100. Movable contact 123 of switch 120 bridges fixed contacts 122 when the switch is in the deenergized position and establishes a charging circuit for a condenser 158 through a resistor 159. The condenser 158 is charged by the voltage appearing across resistor 100. When switch 125 is in closed position contact 123 moves into engagement with contacts 119 and the voltage of the condenser is impressed across resistor 157 in the control member-to-cathode circuit of electric valve 93.

When switch 125 is in the open position condenser 158 is charged with the right-hand plate thereof, as illustrated in the drawings, having a positive potential. When switch 125 is closed this voltage is impressed across resistor 157 so that as soon as a synchronizing impulse is induced in transformer 129 the valve 93 is rendered conductive and a period of energization of the load circuit is initiated. Except for the above differences the operation of the modification illustrated in Fig. 2 is substantially the same as the operation of the modification of Fig. 1 and will not be repeated.

In the arrangements thus far described no provision has been made for the transfer of lagging power factor current where the angle of lag is more than 180 degrees referred to the frequency of the supply circuit. Also, in these arrangements control of load circuit voltage has been effected by means of a phase shifting device for shifting the phase of the excitation applied to the main electric valves at the frequency of the supply circuit. It is contemplated, according to the present invention, that the voltage of the load circuit be controlled by shifting the low frequency excitation of the frequency changer or, in other words, to delay the transfer of current from one group of valves to the other to control the effective voltage applied the load circuit and also to provide for effecting the transfer of energy at any power factor. These two features have been incorporated in the modification shown in Fig. 3. This modification is in general similar to the arrangement of Fig. 1 and the same reference numerals have been applied to corresponding parts.

Referring now to Fig. 3 of the drawings, means for delaying the transfer of current from one group of main electric valves to the other beyond the point which would be established by the restraining valves 139 and 140 and the control circuits associated therewith are provided by additional electric valve means 160 and 161 connected respectively in parallel with electric valves 139 and 140. These valves, like valves 139 and 140 are preferably of the high vacuum type and each comprises an anode 162, a cathode 163 and a control member or grid 164. In order to delay the transfer of current from one group of valves 19, 20, 21 to the other group of valves 22, 23, 24 beyond the time established by the master inverter or frequency determining circuit comprising electric valves 59 and 60, the restraining valves 160 and 161 are controlled in accordance with the current conducted by the two groups of electric valves by means of a circuit designated generally by the numeral 165, and comprising means for producing a voltage which lags the current in transformer 31 by an adjustable amount. As illustrated in the drawings, the substantially square shaped voltage appearing across glow discharge device 146 which is in phase with the current in transformer 32 is impressed on the primary winding of an insulating transformer 166 having a midtapped secondary winding 167. The midtap is connected with the midtap of transformer winding 34 and to a conductor 168 which is periodically brought to a negative potential by operation of the timer control 169 which has been illustrated schematically in Fig. 3 and may for example comprise electric valves 92, 93 and 114 and associated circuits as illustrated in Fig. 1 and described at an earlier point in this specification. The secondary winding 167 is connected to energize a glow discharge device 170. As illustrated, each end terminal of the transformer winding 167 is connected to one terminal of the discharge device 170 through a variable resistor 171 and a reactor 172. The variable resistors 171 are connected together so that they may be varied simultaneously. As is well understood in the art, this circuit will impress a voltage on the glow discharge device 170 which lags the voltage across discharge device 146 by an amount dependent upon the setting of the variable resistors 171. The control members 164 of electric valves 160 and 161 are connected respectively with the opposite terminals of the glow discharge device 170 in such a manner that the instantaneous polarity of the voltage impressed on the control members renders the restraining valves 170 and 171 selectively conductive to delay the transfer of current from one group of valves 19, 20, 21 to the other group of valves 22, 23, 24 beyond that which would normally be established by the master inverter comprising electric valves 59 and 60. The manner in which valves 150 and 161 function to delay the transfer of current from one group of main electric valves to the other will readily be understood from the description of operation of valves 139 and 140. In this way the transfer of current from one group of valves to the other is delayed in accordance with the setting of the variable resistors 171 and is effective to vary the magnitude of the voltage impressed on the load circuit, or in other words, to vary the welding heat.

In order to control the transfer of energy between the supply and load circuit at a power factor causing current to tend to flow for more than 180 degrees referred to the supply circuit after the master inverter has operated to effect transfer current to the other group of main electric valves, it is necessary to render the electric valves successively conductive at the frequency of the supply circuit and at a sufficient time before the impressed anode voltage becomes negative to allow for commutation. That is, it is necessary to supply inverter excitation to the electric valves with respect to the supply circuit 11. In accordance with the illustrated embodiment I provide means for supplying peaked excitation in the proper phase relation with respect to the supply circuit for exciting the electric valves for inverter operation by means of a plurality of the transformers 173 to 178 inclusive, each having a primary winding 179 energized from the proper phase of a three phase supply 180 which, as illustrated, is derived from the supply circuit 11 through a phase shifting device 181. In Fig. 4 I have shown schematically the construction of one of the peaking transformers and as illustrated it comprises in addition to the primary winding 179, a secondary winding 182 and a midtapped tertiary or control winding 183. The windings are wound on a core 184 which is provided with a saturable leg 185 and a shunt 186. Windings 182 and 183 are mutually closely coupled and loosely coupled with winding 179.

Referring to Fig. 3, the secondary windings 182 of the transformers 173 to 178 inclusive, are connected respectively in circuit with the control members 28 of the electric valves 19 to 24. The selective application and removal of the voltage peaks furnishing the inverter excitation for the two groups of main electric valves 19, 20, 21 and 22, 23, 24 is effected by periodically short circuiting certain of the tertiary windings 183.

As illustrated in the drawings, means for selectively short circuiting these tertiary windings 183 is provided by the electric valves 187 to 192. Each of the valves is constructed to operate as a full wave rectifier and is connected so that when it is conducting it short circuits both halves of one of the control windings 183. The cathodes of all of the electric valves 187 to 192 are connected together and the direct current circuit of the parallel connected rectifiers comprising windings 183 and electric valves 187 to 192 is short circuited. The cathode bus 193 of these rectifiers is connected to the midpoint of transformer winding 34 through a suitable biasing means such as a battery 194. The circuit of the control member of electric valves 187, 188 and 189 is completed from an end terminal of the transformer winding 34 through a current limiting resistor, while the control member circuit for the valves 190, 191, 192 is completed from the opposite terminal of transformer winding 34 through a current limiting resistor. Thus, the cathode to control member circuit of each group of valves 187, 188, 189 and 190, 191, 192 includes a source of positive bias in the form of battery 194 and a bias potential depending upon the current flowing in the transformer winding 34 which, as previously explained, is dependent upon which group of main electric valves is conducting current. Battery 194 supplies a positive bias of sufficient magnitude to render the valves 187 to 192 conductive when no current flows in the winding 34. When either group of main electric valves conducts current the potential of one terminal of winding 34 is instantaneously positive and the other terminal is negative. The transformer 32 preferably steps the voltage up to such an extent that as soon as appreciable current flows in the primary winding 31 thereof the secondary voltage reaches the breakdown voltage of the discharge device 146 which maintains the bias voltage supplied by the transformer winding 34 constant substantially throughout the variations of load current. This voltage is of a magnitude sufficient to overcome the positive bias of battery 194 and render nonconductive the group of valves controlled by the terminal of transformer winding 34 which is instantaneously negative. This open circuits the windings 183 and renders one group of transformers such as 173, 174, and 175 effective to supply inverter excitation to the main electric valves 19, 20, 21. As soon as the current conducted by this group of main electric valves is reduced to zero corresponding valves 187, 188, 189 are rendered conductive by bias battery 194 and the inverter excitation supplied by secondary windings 182 is removed from these main valves. Similarly, when valves 22, 23, 24 conduct the valves 190, 191, 192 are rendered nonconductive and inverter excitation is supplied to the main electric valves 22, 23, and 24 by means of the secondary windings 182 associated with transformers 176, 177, and 187. The magnitude of the voltage peaks impressed on the control members of the electric valves 19, 20, 21 and 22, 23, 24 by means of the secondary windings 182 is sufficient in magnitude to excite the valves for inverter operation independently of the operation of the master inverter comprising electric valves 59 and 60. Thus I provide an arrangement which selectively supplies inverter excitation to the different groups of main electric valves in accordance with current flowing in the load circuit.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of direct current voltage, a pair of parallel paths connected to be energized from said source of voltage and each including in series an electric valve having a control member and an impedance element, electric valve means connected in parallel with each of said electric valves and a portion of each of said impedance elements, means including a control circuit for energizing the control members of said electric valve means to effect periodic transfer of current from one of said valve means to the other and thereby effect alternate energization of said impedance elements to provide a periodic voltage, and means for controlling the conductivity of said electric valves to modify the time pattern of said periodic voltage.

2. In combination, a source of direct current voltage, a pair of parallel paths connected to be energized from said source of voltage and each including in series an electric valve having a control member and an impedance element, means including a control circuit for energizing the control members of said electric valves to effect periodic transfer of current from one of said valves to the other and thereby to effect alternate energization of said impedance elements to produce a periodic voltage, a series connected electric valve means and an impedance element connected across each of said electric valves, and means for controlling the conductivity of said electric valve means to produce across said last mentioned impedance element a periodic voltage displaced with respect to said first mentioned periodic voltage.

3. In combination, a source of voltage, a pair of parallel electric paths connected for energization from said source and each including an impedance element connected in series with an electric valve having a control member, means including an energizing circuit for said control members for effecting periodic transfer of current from one of said parallel electric paths to the other to energize alternately said impedance elements and thereby to produce a periodic control voltage across each of said elements, a series connected circuit controlling means and an impedance connected in parallel with each of said electric valves, and means for controlling said circuit controlling means to produce a control voltage across the impedance in parallel with said electric valves having a modified time pattern with respect to said first control voltage in accordance with the operation of said circuit controlling means.

4. In combination, a source of direct current voltage, means energized from said source for establishing a point of reference potential, a pair of parallel paths connected to be energized from said source of voltage and each including in series an electric valve and impedance means, an electric valve means associated with each of said parallel paths and each having the anode-cathode circuit thereof connected in shunt with one of said electric valves and at least a portion of one of said impedance means, means including a control circuit for energizing the control members of said electric valve means to effect periodic transfer of current from one of said valve means to the other and thereby effect alternate energization of said impedance means to provide an output periodic voltage between a point on one of said paths and said point of reference potential, and means for controlling the conductivity of said electric valves to modify said periodic voltage.

5. In combination, a source of direct current voltage, means energized from said source providing a point of reference potential, a pair of parallel paths connected to be energized from said source of voltage and each including in series an electric valve and impedance means, an electric valve means associated with each of said parallel paths and each having the anode-cathode circuit thereof connected in shunt with one of said electric valves and at least a portion of one of said impedance means, means including a control circuit for energizing the control members of said electric valve means to effect periodic transfer of current from one of said valve means to the other and thereby effect alternate energization of said impedance means to provide an output periodic voltage between a point on one of said paths and said point of reference potential, and means for controlling the conductivity of one of said first mentioned valves to maintain said output voltage after the transfer of current from the electric valve means in the path from which said output voltage is obtained.

6. In combination, a source of voltage, parallel electric paths energized from said source of voltage, an impedance element and an electric valve connected in series in each of said paths, a timing circuit for controlling the conductivities of said electric valves to render said valves alternately conductive and nonconductive at a definite periodicity to produce periodic voltages across the impedance elements of said parallel paths, an electric valve means connected in parallel with each of said electric valves, and means for controlling said electric valve means to render both of said last valve means conductive simultaneously to modify said periodic voltages.

7. In combination, a source of direct current voltage, means energized from said source for establishing a point of reference potential, a pair of parallel paths connected to be energized from said source of voltage and each including in series an electric valve and impedance means, an electric valve means associated with each of said parallel paths and each having the anode-cathode circuit thereof connected in shunt with one of said electric valves and at least a portion of one of said impedance means, means including a control circuit for energizing the control members of said electric valve means to effect periodic transfer of current from one of said valve means to the other and thereby effect alternate energization of said impedance means to provide output periodic voltages between said point of reference potential and a point on each of said parallel paths, means for rendering said electric valves alternately conductive to modify said periodic voltage, and means for intermittently rendering said electric valves conductive simultaneously.

8. In combination, a source of direct current voltage, parallel electric paths energized from said source of voltage, an impedance element and an electric valve of the gaseous discharge type connected in series in each of said paths, a timing circuit for controlling the conductivities of said electric valves to render said valves alternately conductive and nonconductive at a definite periodicity to produce periodic voltages across the impedance elements of said parallel paths, an electric valve of the high vacuum type connected in parallel with each of said electric valves, and means for controlling said high vacuum electric valve means to render both of said high vacuum valves conductive simultaneously to modify said periodic voltages.

ORRIN W. LIVINGSTON.